Patented Dec. 12, 1950

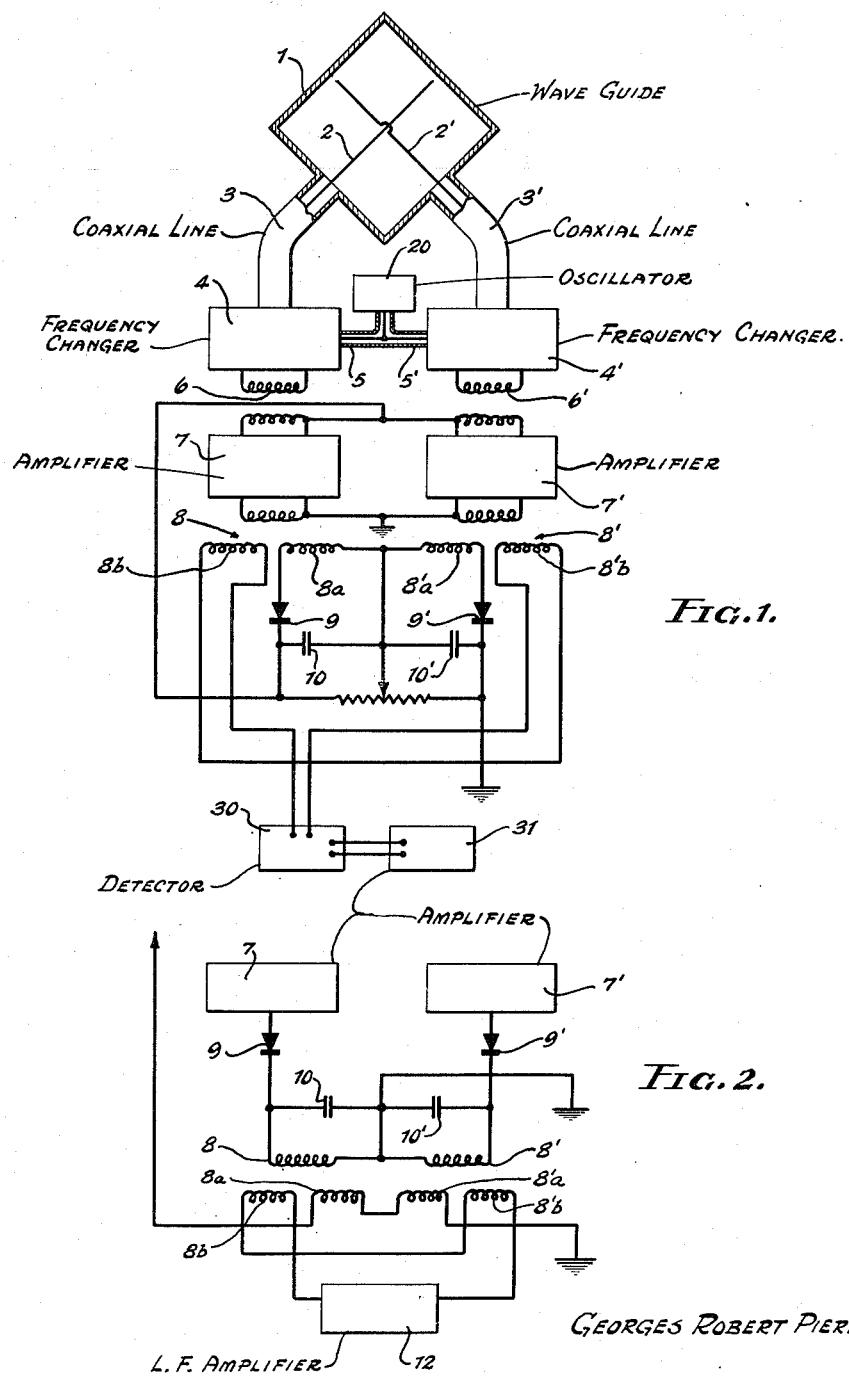

2,533,599

UNITED STATES PATENT OFFICE 2,533,599

RADIO RECEIVING SYSTEM

Georges Robert Pierre Marié, Paris, France, assignor to Societe Francaise Sadir-Carpentier, a corporation of France Application February 18, 1948, Serial No. 9,171
In France March 21, 1947

6 Claims. (Cl. 343—100)

The present invention has for its object improvements in receiving systems for ultra short waves and particularly in receiving systems for ultra short waves modulated by the means described in applicant's copending application Serial No. 4,919, filed January 28, 1948, for improvements in Modulating Systems for Ultra Short Waves.

According to said prior means, the waves produced by a generator are propagated inside a guiding member inside which they assume a rectilinear polarisation to either side of two quarter wave devices including between them a zone submitted to the control of a modulator and wherein they assume a circular or more generally an elliptic polarisation. Consequently said modulation method consists in transforming the waves passing out of the generator into two waves polarised rectilinearly in planes perpendicular to one another, and then modulating both waves as to amplitude in a manner such that the peaks of one of said waves may coincide with the minimum values of the other.

The improvements provided by the present invention while applying the features of the above disclosed modulation allow the execution of a receiving system wherein the antifading action is independent of modulation.

Such a receiving system is of particular advantage with ultra short waves because it allows inter alia the incorporation of antifading means with a very low time constant so that it is particularly capable of following the fluctuations of the propagation of such waves.

The invention will now be described with further detail with reference to accompanying drawings given out by way of mere example without any binding sense.

Figs. 1 and 2 are two wiring diagrams illustrating the invention.

In Fig. 1, 1 designates a wave guide, 2 and 2' probes assuming the shape of inner crossed antennae, 3 and 3' coaxial line elements adapted to connect members 2 and 2' respectively with the two frequency changing devices 4 and 4' for instance, that are mounted in push-pull relationship and are submitted to the action of a same local oscillator 20 and to which they are connected by coaxial line elements 5 and 5'. Two transformers 6 and 6' energize two amplifiers 7 and 7' of intermediate frequency arranged symmetrically while 8 and 8' designate two transformers including each three windings, 9 and 9' being two detectors, 10 and 10' two capacities and lastly 11 a resistance.

The system thus constituted operates as follows: each of the frequency changing devices 4 and 4' produces by reason of the antennae 2 and 2' connected therewith and by reason of the position of the latter inside the guide 1 a first detection of the two rectilinearly polarised modulated waves that are received in said guide.

Thus the primary 6 of the transformer is traversed by a current proportional to $$(1-\tau \cos \Omega t) \sin \omega t$$

Whereas the primary of the transformer 6' is fed by a current proportional to $$(1+\tau \cos \Omega t) \sin \omega t$$

In these formulae, $\omega$ designates the pulsation at intermediate frequency, $\Omega$ the pulsation at the frequency of modulation and $\tau$ the maximum depth of modulation.

After amplification through the amplifiers 7 and 7', there is finally collected on the two secondaries $8a$ and $8'a$ of the transformers 8 and 8' induced voltages that are added to one another and allow the application to the detectors 9 and 9' in series, of a total resultant voltage that is proportional to $\sin \omega t$.

Lastly, after detection, there is collected at the terminals of the resistance 11 a direct current voltage that is proportional also to $\sin \omega t$ and is therefore independent of the frequency of modulation. This voltage is applicable for instance to the grids controlling the amplifiers 7 and 7' that are provided with electronic tubes of variable slopes and said voltage controls consequently the antifading action of the system.

The voltages induced in the two secondaries $8b$ and $8'b$ of the transformers 8 and 8' are applied in a suitable direction to a second detector or to two detectors 30 arranged symmetrically which detector or detectors energise a low frequency amplifier 31.

The time constant appearing in the operation of the antifading means of the above system is defined by the capacities 10 and 10' inserted in series and by the resistance 11. Their products may be very small and the time constant may thus be much lower than the values generally met with heretofore.

In the form of execution of the invention illustrated in Fig. 1 and described hereinabove, the different members have a symmetrical mounting. Said arrangement that corresponds to a preferred form of execution is the natural consequence of the symmetry of the antennae 2 and 2' and of the fact of the latter receiving respectively two waves polarised at right angles with reference to one another without this limiting by any means the possibilities of the invention as defined in accompanying claims.

In particular as concerns the antifading means only, the scope of the invention is not widened unduly by doing away with the symmetrical arrangement of the elements starting from the output of the frequency changers 4 and 4' for instance by using a single transformer constituted by two primaries that are suitably coupled and a single secondary.

The above described symmetrical arrangement ensures an operation that is all the more accurate when the two chains of successive members 2, 3, 4, 6, 7, 8 on one hand and 2', 3', 4', 6', 7', 8' on the other hand generate in the windings 8a and 8'a voltages that are substantially equal in absolute value. In order to satisfy this condition, it is provided firstly, according to the invention, to form the resistance 11 loading the antifading means as a potentiometer the movable rider of which is connected with the common point of the windings.

But obviously, the above condition depends above all on the exact phase shifting between the received waves that are rectilinearly polarised inside the guiding member 1 as well as on their maximum respective amplitudes. In order to allow a compensation either of the relative phase shifting when the polarisation planes are perfectly rectangular, or of the relative amplitude in the case of an elliptic polarisation or else of the phase shifting of the whole system due to the rotary power of the transmitting medium preceding the guide 1 or contained in said guide, the invention provides for the application of any known means.

According to a second form of execution of the invention, any phase shifting correction may be rendered useless by generating the controlling voltage for the antifading after detection of the modulation at low frequency.

By way of example, and by no means in a limiting sense, said form of execution is illustrated in Fig. 2, wherein the same symbols designate the same elements, 12 designating the low frequency amplifier.

Although in the above description only antennae have been considered that form probes inside the guiding member, the invention is by not means limited to such arrangements. In particular, the wave collecting members may be located directly in the outer space or even belong to the most general systems of antenna screens.

What I claim is:

1. Apparatus for the reception of ultra short waves consisting of two high frequency waves rectilinearly polarized in planes at right angles to one another and amplitude modulated in a manner such that the maximum values of one wave correspond to the minimum values of the other, the combination of means for producing high frequency voltages, one from each of the modulated high frequency waves, means for changing the frequency of said high frequency voltages, a variable gain amplifier for amplifying said voltages of changed frequency, means for detecting said last mentioned voltages, a circuit for adding said detected voltages and connections for applying said added voltages to control the amplification of said variable gain amplifier substantially to compensate for fading effects in said ultra short waves.

2. Apparatus for the reception of ultra short waves consisting of two high frequency waves rectilinearly polarized in planes at right angles to one another and amplitude modulated in a manner such that the maximum values of one wave correspond to the minimum values of the other, the combination of a wave guide for said ultra short waves, pickup devices positioned in said wave guide for separately picking up said polarized ultra short waves, a pair of frequency changers connected to said pickup devices respectively, an oscillator connected to said pair of frequency changers whereby the frequency of said ultra short waves is reduced in said frequency changers, a pair of variable gain amplifiers connected to said respective frequency changers, rectifier means and a low time constant circuit connected in series to the outputs of both of said pair of amplifiers and connections for connecting the voltage developed across said low time constant circuit to control the amplification of said variable gain amplifiers substantially to compensate for fading effects in said ultra short waves.

3. Apparatus for the reception of ultra short waves as set forth in claim 2 wherein said rectifier means consists of a pair of rectifiers connected to the outputs of said variable gain amplifiers respectively and said relatively low time constant circuit consists of a resistor connected between said rectifiers so that the outputs of said rectifiers are impressed in series across said resistor.

4. Apparatus as set forth in claim 2 further comprising a pair of transformers connected to the outputs of said variable gain amplifiers, said transformers having secondaries connected in series to said rectifier means, said relatively low time constant circuit including a potentiometer having a variable contact connected to the common connection of said transformer secondaries so that the voltage developed across the resistor of said potentiometer due to the signals received over said separate pickup devices may be made substantially equal in absolute value.

5. In apparatus for the reception of ultra short waves the combination of a pair of receiving devices for separately receiving two high frequency waves rectilinearly polarized in planes at right angles to one another and amplitude modulated in a manner such that the maximum values of one wave correspond to the minimum values of the other, means for changing the frequency of high frequency signals received, variable gain amplifier means for amplifying said signals of changed frequency, means for detecting said signals, a circuit for adjusting the absolute values of the voltages derived from said detected signals to be substantially equal and for adding said detected voltages and connections for applying said added voltages to control the amplification of said variable gain amplifier means substantially to compensate for fading effects in said ultra short waves.

6. In apparatus for the reception of ultra short waves same two high frequency waves rectilinearly polarized in planes at right angles to one another and amplitude modulated in a manner such that the maximum values of one wave correspond to the minimum values of the other, means for changing the frequency of high frequency signals received, variable gain amplifier means for amplifying said signals of changed frequency, means for detecting said signals, transformer means coupled to said amplifier means, said transformer means having a pair of secondaries connected in series, a pair of rectifiers connected to said secondaries respectively, a potentiometer connected between said rectifiers so that the voltages from said rectifiers add in the circuit of said potentiometer, said potentiometer having a variable contact connected to the common connection of said secondaries for adjusting the magnitude of the voltages obtained from each of said secondaries, and connections for applying said added voltages to control the amplification of said variable gain amplifier substantially to compensate for fading effects in said ultra short waves.

GEORGES ROBERT PIERRE MARIÉ.

REFERENCES CITED

The following references are of record in the file of this patent:

UNITED STATES PATENTS

| Number | Name | Date |
| --- | --- | --- |
| 1,892,221 | Runge | Dec. 27, 1932 |
| 2,350,331 | Salinger | June 6, 1944 |
| 2,362,561 | Katzin | Nov. 14, 1944 |
| 2,426,176 | Busignies | Aug. 26, 1947 |
| 2,443,718 | Blodget | June 22, 1948 |

FOREIGN PATENTS

| Number | Country | Date |
| --- | --- | --- |
| 528,061 | Great Britain | Oct. 22, 1940 |